United States Patent [19]

Tanikawa

[11] 4,320,457

[45] Mar. 16, 1982

[54] COMMUNICATION BUS ACQUISITION CIRCUIT

[75] Inventor: Roy K. Tanikawa, Irvine, Calif.

[73] Assignee: General Automation, Inc., Anaheim, Calif.

[21] Appl. No.: 118,546

[22] Filed: Feb. 4, 1980

[51] Int. Cl.³ .............................................. G06F 9/46
[52] U.S. Cl. .................................................. 364/200
[58] Field of Search ... 364/200 MS File, 900 MS File

[56] References Cited

U.S. PATENT DOCUMENTS

| | | | | |
|---|---|---|---|---|
| 3,800,287 | 3/1974 | Albright | | 364/200 |
| 3,886,524 | 5/1975 | Appelt | | 364/200 |
| 3,996,561 | 12/1976 | Kowal et al. | | 364/200 |

OTHER PUBLICATIONS

"Standard Specification for S-100 Bus Interface Devices", IEEE Task 696.1/D2, Draft Feb. 1979.

*Primary Examiner*—Raulfe B. Zache
*Attorney, Agent, or Firm*—Christie, Parker & Hale

[57] ABSTRACT

In a digital processing system in which a plurality of control units communicate with each other and with memory over a common bus, an arbitration circuit associated with each of the control units tests for priority among the units requesting access to the bus, granting access to the highest priority unit as soon as the bus is not busy. Priority is determined by priority numbers assigned to each unit. Priority is tested simultaneously in each unit in synchronism, each unit using common lines on the bus for both input and output to establish which unit has highest priority.

7 Claims, 4 Drawing Figures

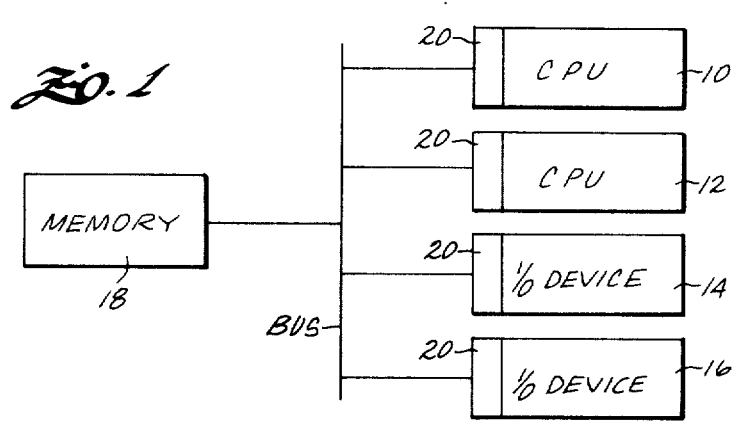
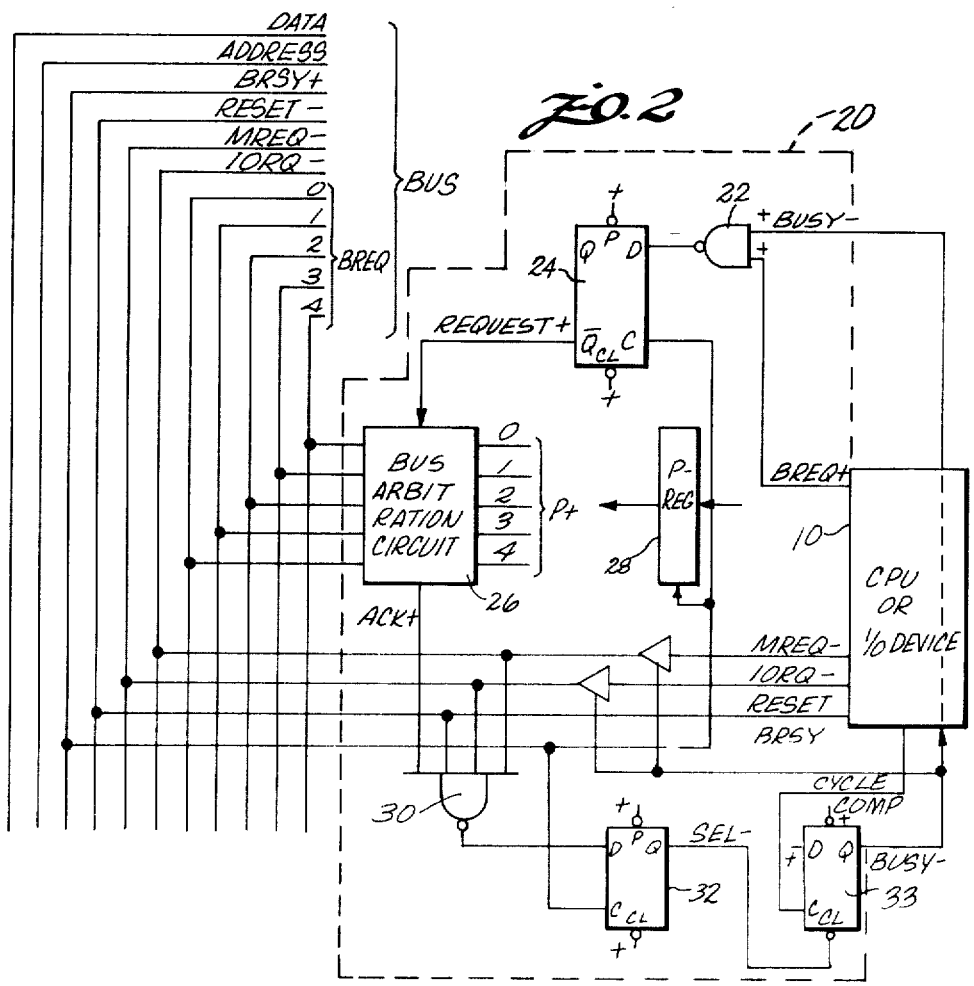

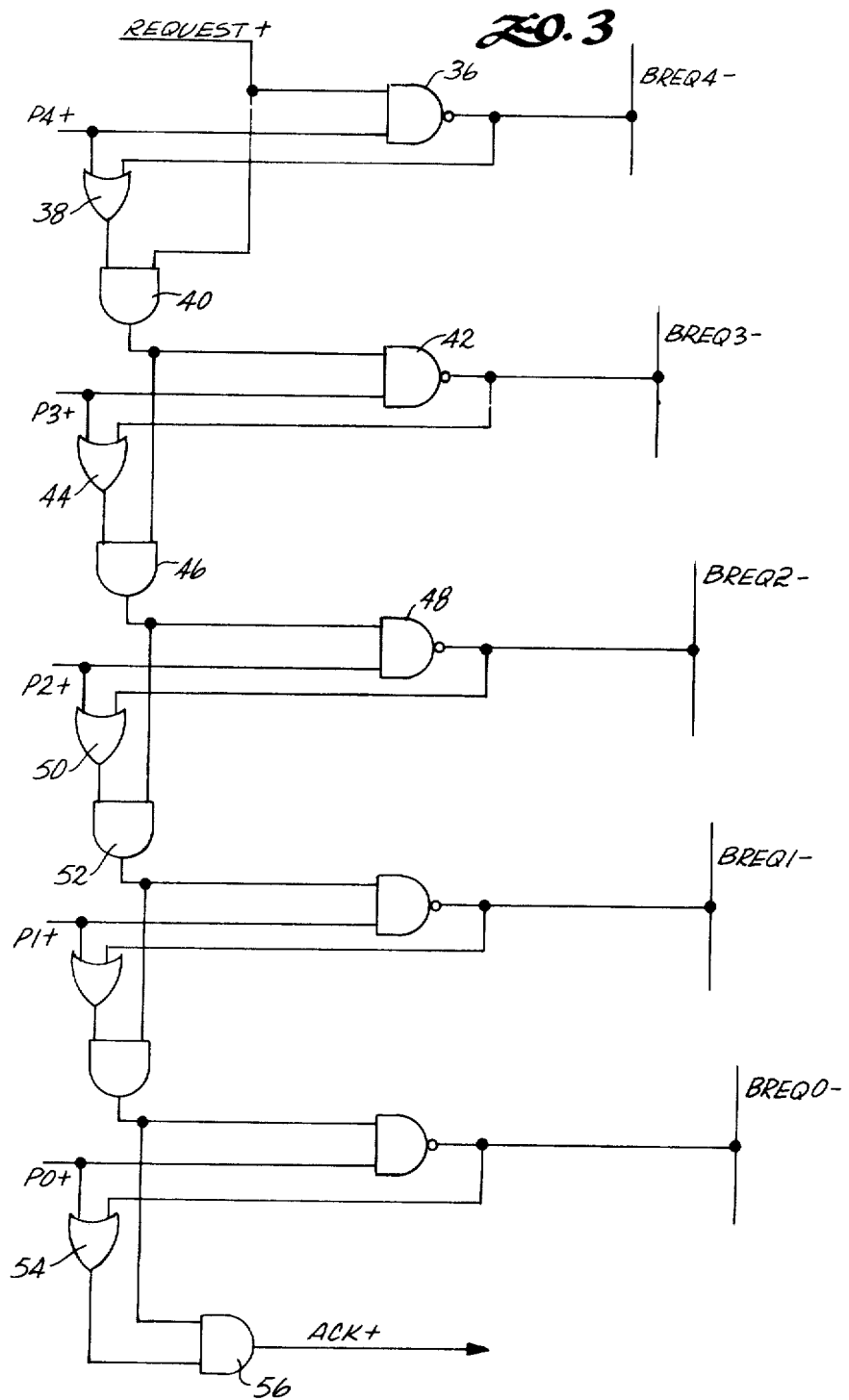

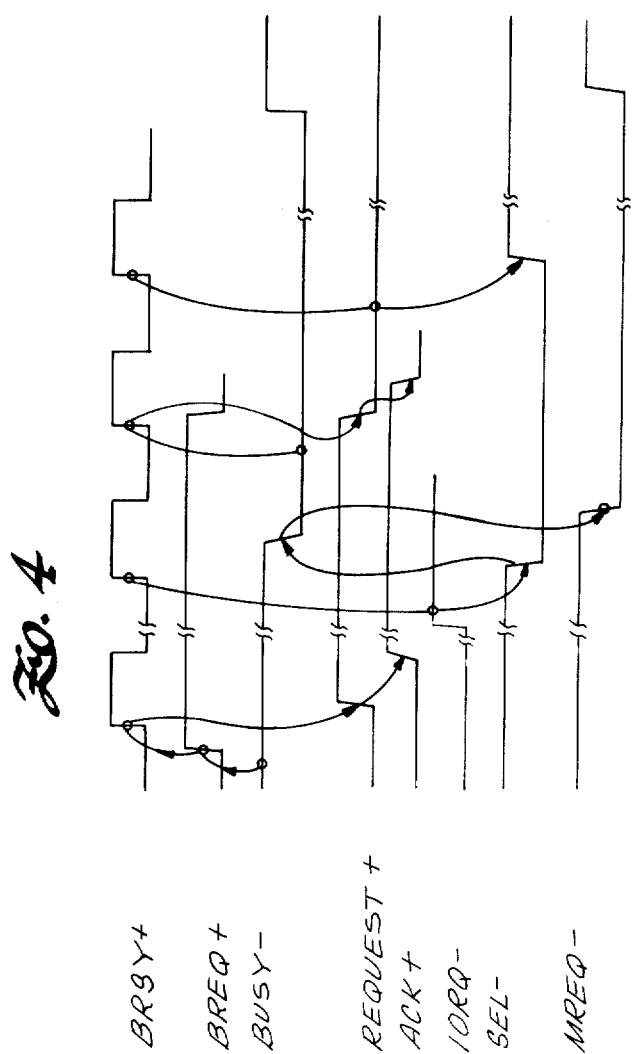

COMMUNICATION BUS ACQUISITION CIRCUIT

FIELD OF THE INVENTION

This invention relates to digital processing systems using a common bus, and more particularly, to a bus acquisition circuit for granting use of the bus on a priority basis.

BACKGROUND OF THE INVENTION

Modular digital computer systems are well known in which one or more central processing units and one or more input-output devices communicate with each other and with a main memory over a common bus. Various schemes have been used for controlling access to the common bus. For example, access to the bus may be provided by a scheme in which each unit is granted access in succession. Right of access is passed on from unit to unit around a closed loop. Under such system, no unit has priority over any other unit, but vacant chassis slots present a problem in maintaining the sequence. Other schemes have been developed in which access is granted on a first come, first serve basis, but this is not always a satisfactory priority solution since the more active units tend to crowd out the less active units.

An alternative bus arrangement has heretofore been proposed in which priority between units contending for access is resolved using a pre-assigned order of priority. In such a system the contending unit that has the highest priority number gains access to the bus. The priority arbitration is repeated whenever the bus becomes available. Such known systems require a master unit, usually the highest priority unit, to control access to the bus, requiring separate control lines between each unit and the master. A modification of this type of system uses common control lines on the bus, including a common set of priority number lines, to interconnect arbitration circuits in each unit with a permanent master unit. Any unit can request access to the bus, and when the permanent master unit releases the bus, arbitration logic in each of the units resolves which unit will gain access, putting a Hold on the bus to lock out all other units. The bus is released back to the permanent master and new access arbitration cycle is initiated. This system, in addition to requiring a permanent master unit, is relatively slow, since the arbitration process must await release of the bus to initiate a new arbitration cycle.

SUMMARY OF THE INVENTION

The present invention provides an improved arbitration circuit for granting access to a common bus. Each unit in the system has an assigned priority number, which may be either hard-wired or generated by software. Access is granted to the requesting unit having the highest priority number. Each unit has its own arbitration circuit. All of the circuits test for priority simultaneously as initiated by a sync signal on the bus, all of the arbitration circuits in units seeking access using a common group of lines on the bus for both an input and an output. The unit having the highest priority sets the levels on the group of lines to its priority number. The arbitration logic continues to assess priority until the bus is released for access. Whenever the bus is released for use, the highest priority unit immediately gains access. Thus the arbitration circuit operates independently of bus availability. Arbitration among the remaining units continues until the bus becomes available. As soon as the bus is again released, the unit granted priority by the arbitration circuits is immediately given access to the bus. The bus is not idled while priority is arbitrated and control of the bus does not have to be returned to a permanent master unit when it is released.

This is achieved, in brief, by providing means at each unit generating a binary coded priority number and providing one conductor in the common bus for each bit of the priority numbers. The level on these conductors is compared with the priority number, starting with the most significant bit. The level on the conductor associated with the highest order bit is set to binary one by any of the arbitration circuits in which the most significant bit of the priority number is a one but remains zero if no priority number bit is a one. Comparison is then made between the next highest order bit and associated conductor in all units in which the level on the highest order conductor is the same as the highest order bit of its priority number. This process is repeated for each of the bits of the priority numbers. The levels on all the common group of conductors are thereby set to the bit values of the highest priority number. Access is then granted to the unit having the highest priority when the bus becomes free and its priority number is removed from the bus. The arbitration operation then establishes a new priority number on the bus. When the bus again becomes free, access is granted to the unit in which these new levels on the bus conductor and the priority number bits are equal.

BRIEF DESCRIPTION OF THE DRAWINGS

For a more complete understanding of the invention reference should be made to the accompanying drawings, wherein:

FIG. 1 is a block diagram of a computer system using the present invention;

FIG. 2 is a schematic block diagram of the bus access control circuit;

FIG. 3 is a logic block diagram of the arbitration circuit; and

FIG. 4 is a timing diagram useful in explaining the operation of the invention.

DETAILED DESCRIPTION

Referring to FIG. 1, there is disclosed a typical computer installation in which one or more central processing units, as indicated at 10 and 12 and one or more I/O, devices indicated at 14 and 16, communicate with each other over a common bus. The same bus is used for communicating with a main memory 18. The various devices communicate in an asynchronous manner, with address information, data information, and various control signals being provided on the bus. Any one of these CPU or I/O devices can initiate either a Read or Write operation in which data is transferred over the bus between any initiating device and any selected device on the bus. Since more than one device may be seeking access to the bus at any given time, a bus access control circuit 20 is provided with each of the devices. The control circuits resolve conflicts, assign priority, and grant access to the bus by the associated device. The bus access control circuit 20 is the same in each of the devices and is described in detail in connection with FIGS. 2 and 3.

Referring to FIG. 2 in detail, the main bus includes a plurality of conductors, one group of which is used to transfer binary coded data, the value of each bit being determined by the level on the corresponding conductor of the bus. A second group of conductors transfers binary coded address information. In addition, a group of control lines is provided including five bus request lines or conductors designated BREQ0— through BREQ4—. By conventional nomenclature, 0 indicates the least significant bit of the group of conductors, and 4 indicates the most significant bit. The minus sign indicates that the binary bit value is 1 or the logic value is true if the corresponding line is at its most negative level. Other control lines include the BRSY+ line, which is a synchronizing square wave clock signal from an oscillator in one of the central processing units. The IORQ— line and the MREQ— line are used by each of the devices to indicate that the device is granted access to the bus and is causing either a transfer to an input-output device or to the memory. The RESET— line is used to reset all the logic of the system.

Any of the CPU or I/O devices can initiate access to the bus by setting BREQ+ output from the device to 1. This line is applied to one input of logical NAND gate 22 in the access control 20 together with a BUSY— output from the device. The latter output is normally false (positive) except when the device has access to the bus. If the device requesting the access to the bus is not busy, when the sync signal on the BRSY+ line goes true, a flip-flop 24 causes the output line REQUEST+ to go true. This activates a bus arbitration circuit 26, described below in connection with FIG. 3. The bus arbitration circuit in combination with the arbitration circuits in the access control 20 of all the other devices on the bus determines whether the priority number assigned to the device and stored in a P-register 28 has the highest priority of all devices currently contending for access to the bus. The priority number stored in the P-register 28 may be loaded in the register by the software of the system, may be hard-wired, preset by switches, or otherwise established by conventional means. In any event the output of the P-register 28 provides a five-bit binary coded priority number which is compared with the bits on the five BREQ— control lines of the bus, at the same time setting these lines to the bit values of the highest priority number of the contending devices.

Only the bus arbitration circuit 26 in the requesting device having the highest priority number causes the level on an output line ACK+ to go true, acknowledging that the associated unit has highest priority. The ACK+ signal is applied as one input to a NAND gate 30 together with other inputs which include the MREQ—, IORQ—, and RESET—. If all these control lines are positive, indicating that there is no pending memory request, I/O request, or reset condition on the bus, the output of the NAND gate together with the BRSY+ synchronizing signal causes the Q output of a flip-flop 32, designated SEL—, to go true (negative). This signals the CPU or I/O device that it has been granted access to the bus. A flip-flop 33 is reset by the SEL— level, causing BUSY— to go true, indicating a busy condition and causes either MREQ— or IORQ— to go true on the bus, signaling a memory request or an I/O request to the bus. The CPU or I/O device then initiates a data transfer over the bus in conventional manner and when the transfer is complete, the CPU or I/O device generates a cycle complete signal to the flip-flop 33, causing the BUSY— signal and the MREQ— or IORQ— signals to go false and releasing the bus for access by other devices.

It should be noted that when the BUSY— line goes true, indicating that the bus is in use by the particular device, the flip-flop 24 is set and the REQUEST+ line goes false. This, in effect, removes the associated arbitration circuit 26 from the system, allowing other devices seeking access to the bus to establish priority on the BREQ bus lines according to the highest priority of the other contending devices. Thus, as soon as the current memory request or the I/O request condition is terminated, another device can gain access to the bus if it has the highest priority number of the other contending devices. Thus there is no delay in establishing priority. It will be further noted that with the five-bit priority number, given by way of example only, up to 32 devices can contend for use of the bus.

Referring to FIG. 3, a suitable bus arbitration circuit logic is shown schematically. If the REQUEST— line from the flip-flop 24 is true, indicating that the associated CPU or I/O device has requested bus access, the output of a NAND gate 36 causes the BREQ4— line to go negative if the highest order bit P4+ of the priority number in the P— register 28 is a 1. If the highest order priority bit P4 is a zero, the NAND gate will not cause the BREQ4— line to go true. However, it will be seen that if the P4+ bit is true in any of the other arbitration circuits of the contending devices, the BREQ4— line will nevertheless go true. The BREQ4— line and the P4+ line are connected as two inputs to a logical OR gate 38, the output of which is connected as one input to an AND gate 40 together with the REQUEST+ line. It will be seen that the output of the AND gate 40 is true only if the P4+ bit is a 1 or if the BREQ— line is false. This means that the output of the AND gate 40 is true only if the particular device has the same bit value on the BREQ4— line, indicating that the associated device is still in contention for priority. The logic circuit then makes a comparison on the next order bit.

The output of the AND gate 40 is applied to one input of a second NAND gate 42, the output of which is connected to the BREQ3— control line of the bus. The P3+ line from the priority number is also applied to the NAND gate 42. Thus the device sets the BREQ3— line true if the P3+ bit is true and the device is still in contention for priority as indicated by the output of the AND gate 40 being true. An OR gate 44 and an AND gate 46 provide an output that is true only if the associated device is still in contention for priority after testing the two highest order bits of the priority number. If so, the next lower priority bit, $P_2$, is compared with the BREQ2— line through an AND gate 48, and an OR gate 50 and AND gate 52 provide an output that is true if the device is still in contention for highest priority. The same logic is repeated for the P1 and P0 bits. The output of an OR gate 54 and AND gate 56 provide an output designated ACK+ which is true if after testing all five bits of the priority number, priority is determined.

If ACK+ is true, the lines BREQ0— through BREQ4— are coded to indicate the priority number of the highest priority contending device. However, once the highest priority device gains access to the bus, as noted above, the REQUEST+ lines goes false, and the priority number of the associated device is in effect removed from the BREQ lines of the bus. The setting of these lines is then controlled by the highest priority device of the remaining contending devices seeking access to the bus.

Operation of the bus access control circuit 20 can be better understood by reference to the timing diagram of FIG. 4. The BRSY+ signal is a square wave whose positive going leading edges are used to synchronize operation of the logic in each of the control circuits. As shown by the timing diagram, if the BUSY− level is false (positive) and the bus request signal BREQ+ goes true, when the leading edge of the synchronizing signal BRSY+ goes positive, the REQUEST+ signal at the output of the flip-flop 24 goes true. Assuming the device 10 has the highest priority number, this will cause the ACK+ signal to go positive after a delay necessary for the REQUEST+ signal to propagate through the logic gates of the bus arbitration circuit 26. ACK+ will remain true as long as the bus is still in use by another device, as indicated by IORQ−, MREQ−, or RESET being true (negative). In FIG. 4 it is assumed that IORQ is true at the time ACK+ goes true. As soon as both the IORQ− and the MREQ− are false, indicating the bus is free, the next positive going edge of the synchronizing signal BRSY+ actuates the flip-flop 32 causing the SEL− signal to go true. The BUSY− signal then goes true, indicating that the associated device is in a busy condition and either the IORQ− level or the MREQ− level goes true, initiating an I/O request or a memory request over the bus.

The next positive going leading edge of the synchronizing signal BRSY+ after the BUSY-condition goes true turns off the REQUEST+ signal, removing the priority number from the bus. This causes the ACK+ signal to go false and the flip-flop 32 to be operated by the next leading edge of the synchronizing signal BRSY+, causing the SEL− signal to go false (positive). After the associated device completes its communication over the bus, the BUSY− and the MREQ− levels are reset by the device, completing the bus access.

A significant feature of the access control logic is that arbitration takes place independently of bus availability. All the time bus is in use by one device, priority is continuously arbitrated among any other devices contending for access. Only the contending device of highest priority at the time the bus is released gains access by making SEL− true with the next BRSY leading edge and immediately causing BUSY− and either IORQ or MREQ to go true. Arbitration among any or all of the remaining devices continues uninterrupted. Thus the bus is reassigned in less than one clock interval to the highest priority contending device at the time the bus is released. The relative priority among the contending devices can be changing continuously while the bus is busy, either by different devices asynchronously requesting the bus or terminating a request for the bus, or by the software changing the priority numbers stored in the P-register 28.

What is claimed is:

1. Apparatus for resolving priority between a group of devices contending for use of a common multi-conductor communication bus, comprising:

means at each device generating a binary coded multi-bit priority number, a group of conductors in the bus connected to each of the devices, there being one conductor for each bit of the priority numbers, means at each device connected to the group of conductors and the associated means generating a priority number for forcing the conductor associated with each bit of the priority number to the value of the associated bit when the bit is at a first predetermined one of its binary values, means at each device connected to the conductors and to said means generating a priority number for comparing each order of bit in the priority number with the binary value of the associated conductor, means in each device inhibiting the comparing means of the lower order bits when a higher order bit comparison is not equal, means at each device responsive to the comparing means when all the priority number bits are equal to the bit value on the associated conductors for generating a signal indicating that the associated device has priority, means at each device connected to the bus for generating a signal on the bus indicating when the bus is available for use by any of the rival devices, and means at each device connected to said means responsive to the comparing means and connected to the bus, said last-named means being responsive to said signal indicating the device has priority and said signal indicating the bus is available for providing access to the bus by the associated device whenever said signal on the bus indicates the bus is available.

2. Apparatus of claim 1 further including means disabling the said means forcing the conductors of said group of conductors to the priority number value when the associated device is provided access to the bus, whereby the conductors can be set to another priority number.

3. Apparatus of claim 2 further comprising synchronizing means connected to each of the devices for periodically initiating a priority resolving cycle simultaneously in each of the devices independently of the status of the bus.

4. Communication bus arbitration circuit for granting access to multi-conductor communications bus by one of a plurality of contending devices connected to the bus, comprising at each device:

means generating a multiple bit binary coded priority number, the priority number being different for each of the plurality of devices, means for coupling said binary coded priority number of each device onto a common group of conductors in the communications bus, there being one common conductor for each bit of the priority number, arbitration means connected to said group of conductors and to said means generating a priority number comparing the bits on said group of conductors with the coded bits of the priority number, said arbitration means generating an output signal indicating when the binary coded number on the conductors is equal to the priority number of the associated device, means for providing a signal on a conductor in the bus indicating when the bus is in use or not in use, and means connected to the output signal of the arbitration means and said signal indicating when the bus is not in use for connecting the device to the bus when the coded number on the bus conductors is equal to the coded priority number and the bus is not in use.

5. In a modular computer system having a plurality of units that communicate with each other over a common bus, apparatus for arbitrating requests for access to the bus among a plurality of contending units, comprising:

a group of conductors corresponding to the number of bits in the priority number extending to the access control circuit of each unit, an access control circuit associated with each unit, each access control circuit including means generating a group of binary coded signals representing an assigned priority number unique to the associated unit, each unit having priority over all units in which the associated priority number is of lower value, means connected to said group of conductors normally holding each of the conductors at a first predetermined voltage level representing one binary value, means connected to a separate conductor in the bus for generating a bus access request signal on the bus, means connected to said separate conductor in the bus and the means generating the priority number responsive to a bus access request signal for switching each of said group of conductors starting with the highest order bit to a second voltage level when the corresponding order binary bit of the priority number is at its higher value regardless of the action of any other access control circuit, whereby the conductors are changed to the second level if the corresponding order bit of any of the priority numbers of the contending access control circuits is at its higher value, means connected to said group of conductors in the bus and said means generating a priority number for inhibiting the switching of any of the lower order conductors when the next higher order bit of the priority number and the associated conductor voltage level do not represent equal binary values, comparing means connected to the bus and said means generating a priority number for sensing when all the bits of the priority number are of equal value with the levels on said group of conductors and generating an output signal indicating that the associated device has priority, means generating a signal indicating when the bus is available for use, and means receiving said signal indicating the device has priority and the signal indicating when the bus is available for providing access to the bus to the associated unit.

6. Apparatus of claim 5 further comprising synchronizing means connected to the bus for periodically initiating a priority resolving cycle in each of the units.

7. Apparatus of claim 6 further including means responsive to said means providing access to the bus for disabling said bus access control signal and disabling said means switching each of said group of conductors when the associated device has gained access to the bus.

* * * * *